Figure 1:
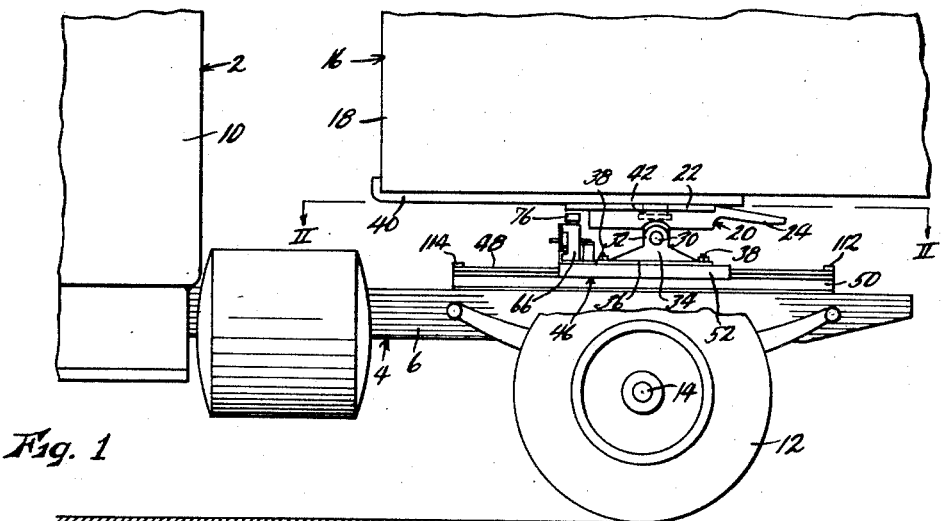

Jan. 7, 1958

C. M. SENCENICH 2,819,096

SHIFTABLE FIFTH WHEEL MOUNTING
FOR AXLE LOADING ADJUSTMENT

Filed Oct. 30, 1956

2 Sheets-Sheet 1

INVENTOR
Carl M. Sencenich
BY Hamilton & Hamilton
Attorneys.

Jan. 7, 1958
C. M. SENCENICH
2,819,096
SHIFTABLE FIFTH WHEEL MOUNTING
FOR AXLE LOADING ADJUSTMENT
Filed Oct. 30, 1956
2 Sheets-Sheet 2
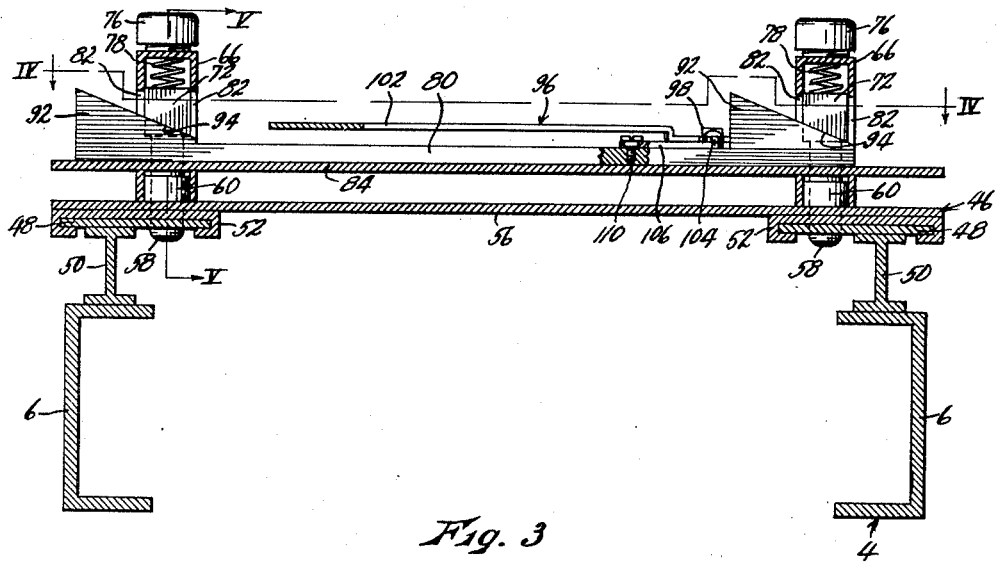
Fig. 3
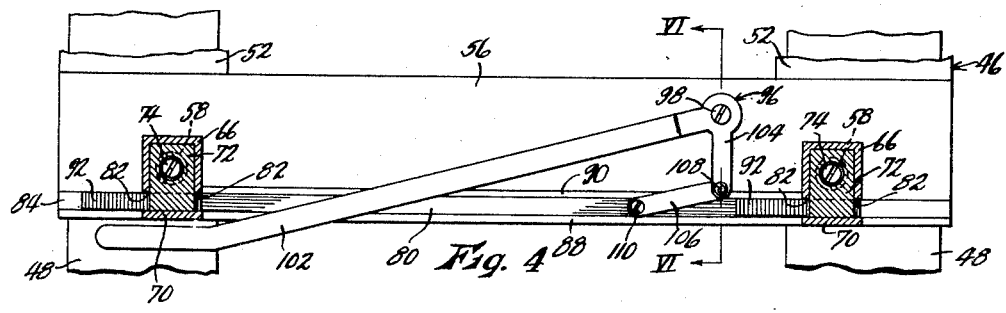
Fig. 4
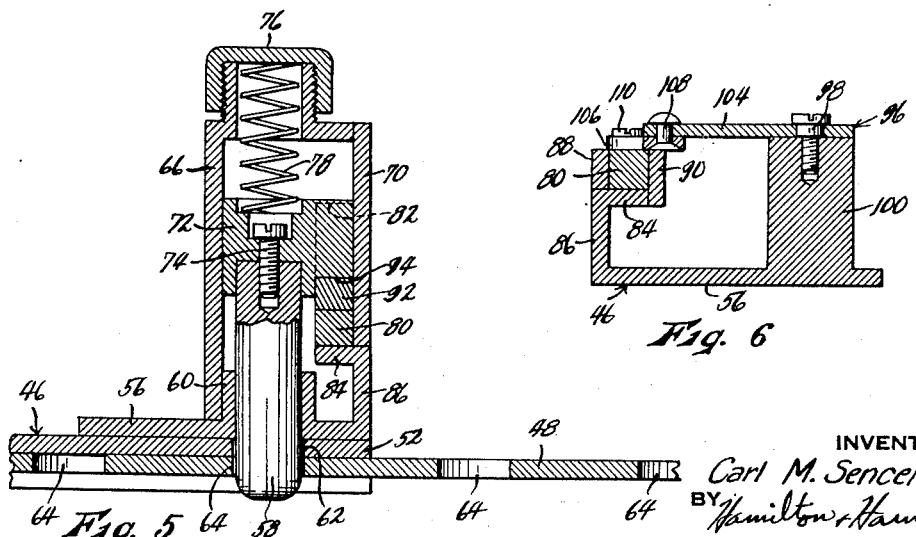
Fig. 5
Fig. 6
INVENTOR
Carl M. Sencenich
BY Hamilton & Hamilton
Attorneys.

United States Patent Office 2,819,096
Patented Jan. 7, 1958

2,819,096

SHIFTABLE FIFTH WHEEL MOUNTING FOR AXLE LOADING ADJUSTMENT

Carl M. Sencenich, Kansas City, Kans.

Application October 30, 1956, Serial No. 619,214

2 Claims. (Cl. 280—407)

This invention relates to new and useful improvements in fifth wheel devices such as are commonly used in the trucking industry to connect the tractor and trailer units of commercial trucks, and relates more specifically to a new and novel means for mounting such fifth wheel assemblies on the tractor unit of such truck combinations.

Fifth wheel operation is of course generally well understood, the device being operable to provide a universal front connection of a trailer, which is customarily provided only with one or more rear axles, to the rearward portion of a tractor, which is customarily provided with both front and rear axles. The principal object of the present invention is the provision of means whereby the fifth wheel connection may be shifted forwardly or rearwardly at will with respect to the tractor unit. This adjustment is of the greatest assistance in meeting and complying with the truck-loading laws enacted by various governmental agencies for the protection of public roads and safety.

These laws fall generally into three categories: Firstly, limitations on the overall length of the tractor-trailer combination. Secondly, limitations on the load supported by each axle. Thirdly, limitations on the load per axle wherein the load limit is based on the distance between the rear axle of the tractor and the rear axle of the trailer. The latter are often called "bridge" laws. The adjustment I propose will tend to permit conformity with all of these laws. Shifting the point of support forwardly or rearwardly with respect to the tractor will not only change the overall length of the tractor-trailer combination and the distance between the tractor and trailer axles, but will also permit proportioning of the trailer weight supported by the fifth wheel between the front and rear tractor axles. For example, shifting the fifth wheel forwardly and closer to the front tractor axle will impose a greater proportion of the weight to said front axle, and a correspondingly smaller proportion on the rear tractor axle.

Other objects of the invention are the provision of a mounting of the character described which is simple and economical in structure, dependable and efficient in operation, which is not likely to get out of order, wherein the latching means which secures the mounting at any desired position is easily releasable by manual force, and which is virtually universally adaptable to many types of pre-existing trucks and fifth wheel mechanisms.

Figure 2:
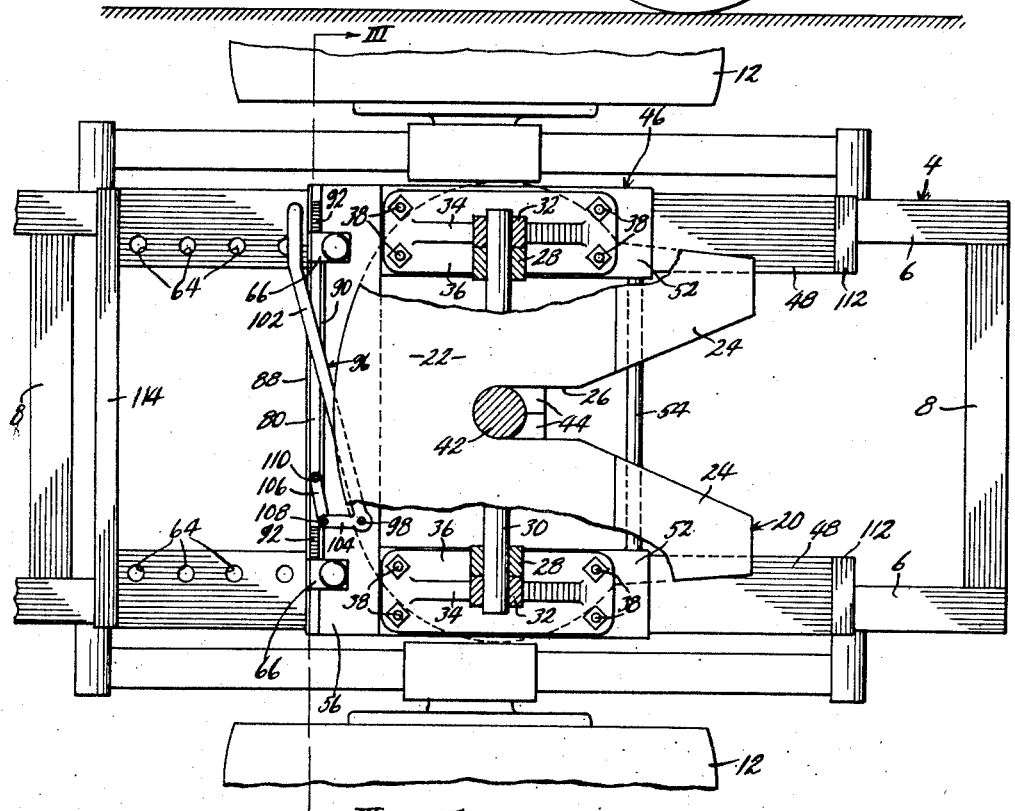

With these objects in view, as well as other objects which will appear in the course of the specification, reference will be had to the drawing, wherein:

Fig. 1 is a fragmentary side elevational view of a tractor and trailer combination, showing the fifth wheel connection therebetween, and including a fifth wheel mounting embodying the present invention, Fig. 2 is an enlarged fragmentary sectional view taken on line II—II of Fig. 1, with parts broken away, Fig. 3 is an enlarged fragmentary sectional view taken on line III—III of Fig. 2, with parts broken away, Fig. 4 is a fragmentary sectional view taken on line IV—IV of Fig. 3, Fig. 5 is an enlarged fragmentary sectional view taken on line V—V of Fig. 3, and Fig. 6 is an enlarged sectional view taken on line VI—VI of Fig. 5.

Like reference numerals apply to similar parts throughout the several views, and the numeral 2 applies generally to a truck tractor unit including a frame 4 consisting of a pair of horizontal, parallel, spaced apart channels 6 connected at various points along their length by cross bars 8. The usual cab 10 is mounted on the forward portion of frame 2, and it will be understood that the forward end of the frame is supported by the usual front steerable wheels, not shown. The rearward end of the tractor frame is supported by ground-engaging wheels 12 carried by rear axle 14. The truck trailer 16 includes a trailer body 18 which it will be understood extends substantially rearwardly from the tractor and is supported adjacent its rearward end by the usual rear axle and wheels, not shown.

The trailer body is connected adjacent its forward end to the tractor frame by means of a fifth wheel mechanism 20 including a generally ovate pressure plate 22 having a planar upper surface and having downwardly and rearwardly inclined tongues 24. Said pressure plate is provided with a slot 26 opening through the rearward edge of the plate and tapers forwardly to the central portion of the plate. The plate is supported by bearings 28 for pivotal movement on a horizontal axle 30 transverse to the line of travel of the truck, said axle being supported in bearings 32 which are formed integrally with standards 34. Said standards are each provided with an enlarged foot 36. Said feet are provided with securing bolts 38 which in the common installation serve to affix feet 36 rigidly to the tractor frame, but which according to my invention affix said feet to a movable carriage, as will be described.

Trailer body 18 has a skid plate 40 attached to the bottom thereof and extending rearwardly from the forward end thereof. A short, heavy kingpin 42 is fixed in and depends from said skid plate. Thus when the rearward end of the tractor is backed under the forward end of the trailer, skid plate 40 contacts and slides over pressure plate 22, kingpin 42 entering and passing forwardly through slot 26 of said pressure plate. When the kingpin reaches the forward end of the slot, it is automatically locked therein by a mechanism including jaws 44, said mechanism being carried on the lower side of pressure plate 22, but not being detailed here, since the structure thereof forms no part of the present invention.

According to my invention, the fifth wheel feet 36 are mounted on a carriage 46 mounted movably on a pair of tracks or rails 48 affixed to tractor frame 2. Each of tracks 48 comprises a flat steel plate disposed above and parallel to one of frame channels 6, and is affixed to said channel by an I-beam 50 which is coextensive therewith, the bottom flange of the I-beam being welded to channel 6, and the upper flange of the I-beam being welded to the track. Preferably the tracks extend both forwardly and rearwardly from the vertical plane of rear tractor axle 14.

Carriage 46 comprises a pair of C-shaped channels 52 carried respectively on the two tracks 48, the central web of said channel being planar and resting in sliding contact with the track, and the edge portions of said channel having a sliding "hook" engagement with the edges of the track, as clearly shown in Fig. 3. The carriage channels 52 are rigidly joined at their rearward ends by a cross bar 54 (see Fig. 2), and at their forward ends by a cross bar 56 formed of plate stock. It will be understood that feet 36 of the fifth wheel bearings 32 are secured by bolts 38 to carriage channels 52. Said channels may be bored specially to receive the bolts for any particular fifth wheel, or they may have a plurality of holes bored therein so as to be adapted to receive various types of fifth wheel feet. It is quite important that the carriage channels 52 be of substantial length as compared to their width, and that they have full-length engagement with the tracks, in order to prevent possible binding or cramping thereof on the tracks under the extreme loading conditions involved.

The carriage is releasably held at any of a series of positions along tracks 48 by a pair of detent pins 58 carried by cross bar 56 and engageable respectively in tracks 48. As best shown in Fig. 5, each of said pins is disposed vertically and carried slidably in a cylindrical guide 60 integrally connected to cross bar 56. Said pin extends downwardly through a hole 62 formed in carriage channel 52, and then selectively through any of a series of longitudinally spaced apart holes 64 formed in track 48. Said detent pin extends upwardly from guide 60 into a rectangular housing 66 which essentially comprises a forwardly opening channel welded to cross bar 56, with the forward portion thereof closed by a plate 70 welded thereto. Carried for vertical sliding movement in said housing is a substantially rectilinear block 72 which is secured to the upper end of detent pin 58 by screw 74. The upper end of housing 66 is closed by a removable cap 76, and a compression spring 78 retained between said cap and said block serves to urge the detent pin downwardly to its operative position.

The detent pins may be elevated to an inoperative position above tracks 48 by a mechanism including an operating bar 80 which extends horizontally between the two detent housings 66, and through windows 82 formed in the opposite side walls of each of said housings. Said operating bar is disposed forwardly of the detent pins, but beneath the forward portions of the blocks 72, and is supported throughout its length by a rearwardly extending ledge 84 which is carried at the upper edge of an upstanding wall 86 disposed along the forward edge of cross bar 56. Said operating bar is longitudinally slidable along said ledge. It is braced against lateral movement by upstanding walls 88 and 90 affixed to ledge 84 respectively along the forward and rearward edges thereof.

A pair of wedges 92 are welded to the upper edge of bar 80, respectively adjacent each of the detent housings 66. The inclined upper face of each of said wedges rests in engagement with a correspondingly inclined wedge follower surface 94 of the associated detent block 72. It will be apparent that if bar 80 is moved to the right as viewed in Figs. 3 and 4, wedges 92 will elevate blocks 72 above tracks 48, so that the entire carriage 46 may be shifted forwardly or rearwardly along said tracks. The operating bar is moved by means of a bell crank lever 96 pivoted at 98 to a boss 100 formed integrally with a cross bar 56. Said lever has a long arm 102 and a shorter arm 104. A link 106 is connected at one end to the movable end of lever arm 104 by pivot 108, and is connected at its opposite end to operating bar 80 by pivot 110.

Pulling lever arm 102 forwardly will urge bar 80 to the right as viewed in Figs. 3 and 4. The mechanical advantage of the lever itself, and that of the wedges 92, provides a tremendous lifting force on the detent pins 58, so that they may be disengaged even through there may be a great load on the fifth wheel connection. The tractor may then be moved forwardly or rearwardly to cause relative movement of carriage 46 along tracks 48, for the purpose of changing the overall length, axle spacing, or load distribution to the axles, as previously described. When the carriage is disposed approximately at the position desired, lever arm 102 is returned rearwardly to its normal position, which moves wedges 92 to the left, and frees blocks 72 therefrom. When detent pins 58 pass over the next holes 64 of the tracks, they will be urged downwardly into said holes by springs 78.

For safety, in order to prevent possible separation of the tractor and trailer in the event the detent mechanism should fail, there is provided an upstanding block 112 welded or otherwise secured to the upper surface of each of tracks 48 at the rearward ends thereof, and a transverse cross bar 114 welded to the upper surface of said tracks at the forward ends thereof. These blocks and cross bar prevent the carriage from travelling off of either end of the tracks.

While I have shown and described a specific embodiment of my invention, it will be apparent that numerous minor changes of structure and operation could be made without departing from the spirit of the invention as defined by the scope of the appended claims.

What I claim as new and desire to protect by Letters Patent is:

1. A fifth wheel mounting for a truck tractor having a frame, said mounting comprising a track adapted to be affixed to said tractor frame so as to extend forwardly and rearwardly, a carriage mounted on said track for movement therealong, said carriage being adapted to carry a fifth wheel assembly mounted thereon and movable therewith, a detent pin carried by said carriage for movement relative to said carriage transverse to the direction of movement of said carriage on said track, said detent pin being selectively engageable in any of a series of apertures formed therefor in said track, resilient means carried by said carriage and urging said detent pin to an operative position engaging said track, a wedge member carried by said carriage for movement in a direction transverse to the movement of said detent pin, said wedge engaging a cooperating wedge surface rigidly associated with said detent pin, and manual means operable to move said wedge whereby to retract said pin to an inoperative position, against the pressure of said resilient means.

2. A mounting as recited in claim 1 wherein said track comprises a pair of spaced apart apertured rails and said carriage includes a pair of channel members rigidly connected together and respectively engaging said rails for sliding movement therealong, and wherein each of said channels is provided with a detent pin as recited and operable to engage selectively the apertures of the associated rail, and with the addition of an operating member carried by said carriage for movement transverse to said detent pins, said operating wedge for each of said pins both being mounted on said operating member.

References Cited in the file of this patent

UNITED STATES PATENTS

| Re. 23,704 | De Lay | Sept. 1, 1953 |
| 2,317,508 | Zoder | Apr. 27, 1943 |
| 2,713,500 | Flynn | July 19, 1955 |
| 2,750,207 | Greenway | June 12, 1956 |
| 2,755,104 | Braunberger | July 17, 1956 |